Patented Nov. 8, 1932

1,886,586

UNITED STATES PATENT OFFICE

LANNING PARKE RANKIN, OF DOVER, NEW JERSEY, ASSIGNOR TO HERCULES POWDER COMPANY, OF WILMINGTON, DELAWARE, A CORPORATION OF DELAWARE

DRYING OIL

No Drawing.   Application filed October 18, 1927.   Serial No. 227,055.

My invention relates to an improvement in drying oils and method of producing the same. More particularly, my invention relates to a drying oil comprising a pine derivative and which may be substituted for linseed oil in paints and varnishes and in other uses for which linseed oil has heretofore been used.

The drying oil in accordance with my invention may be produced by the treatment of turpentine, pine oil, dipentene, and the like. In producing the drying oil in accordance with my invention the pine oil, turpentine, or the like is first subjected to a polymerization treatment, for example, by the application of heat and preferably in the presence of a polymerizing agent, as for example an acid, as sulphuric acid, fullers' earth, activated carbon, a metallic chloride, or the like. The polymerization treatment results in the production of a product consisting essentially of di- and tri-terpenes, a certain small proportion of higher polymers being also present.

According to my invention the turpentine, pine oil, or the like after the polymerization treatment is complete, is subjected to ozonization, as for example by bubbling air or oxygen containing ozone through the polymerized product.

More specifically describing the method involved in the production of the drying oil, for example, dipentene to which a metallic chloride, as, for example, stannic chloride, zinc chloride, or the like, has been added is refluxed for say about one-half hour. When the polymerization is complete the polymerized product is separated from the lower boiling ends, or unpolymerized portion of the product, by distillation up to say about 250° C. The residue will comprise essentially di- and tri-terpenes together with a small proportion of higher polymers and will have a specific gravity of about 0.95 and a boiling range such that about 5% will distill over at 305° C., 20% at 326° C., 50% at 335° C., 70% at 342° C. and 90% at 375° C.

The polymerized product obtained, for example, as above, is subjected to ozonization by bubbling through a mass of the product, for example, ozonized air or ozonized oxygen or adding a liquid as carbon tetrachloride containing ozone. While air containing ozone may be used satisfactorily for ozonizing, I prefer to use oxygen containing ozone since the concentration of ozone in oxygen is greater than in air. More specifically, the ozonization may desirably be carried out by bubbling dilute ozone, as air or oxygen containing ozone, giving say 2 g. ozone per hour through say 100 g. of polymerized product for say four hours. During the ozonization the polymerized product will tend to heat and may be desirably cooled, it being understood that the viscosity of the final product may be controlled to some extent by control of the temperature during ozonization.

The polymerized product for ozonization may, as has been indicated, be produced by effecting the polymerization of pine oil, the pine oil being heated in the presence of, for example, fullers' earth, a metallic chloride, an acid, etc., to effect dehydration and subsequent polymerization, or by effecting the polymerization of turpentine. The polymerized product obtained is then subjected to ozonization as indicated, either as produced in admixture with certain low ends, or unpolymerized ingredients, or after the separation out of such low ends; and if desired the polymerized product may be split up, as by fractionating the polymerized product from which the low ends have been removed and the di-terpene and tri-terpene subjected to ozonization separately.

The ozonized polymerized product, or drying oil according to my invention will be found to be of a light color, since the ozonization tends to bleach the polymerized product, and will not require boiling to "body" it, since it normally contains the necessary polymers to give it requisite body, and its body or viscosity may be controlled somewhat through the control of the temperature during ozonization. The dry film will possess substantial elasticity and will have a drying rate comparable to that of linseed oil containing drier. On drying the product will give a film possessive of considerable gloss and impervious to, for example, a 5% aqueous sodium hydroxide solution or gasoline.

The drying oil according to my invention may be used as a substitute for linseed oil in, for example, paints and varnishes and for other uses. In the use of the drying oil as a substitute for linseed oil in, for example, a varnish, a solution of say 10% ester gum dissolved in say 50% turpentine is added to say 40% ozonized polymerized product. Heating is unnecessary in making up the varnish, except possibly to facilitate dissolving of the gum in the turpentine. The varnish according to the formula above given will produce a film with a very high gloss, being dry to dust in less than 18 hours and completely drying in from 24 to 36 hours.

While in accordance with my invention it is preferable that the polymerized product be ozonized before use, it may be effectively ozonized and its drying rate increased after spreading it out in a film by exposing a film of the unozonized polymerized product to an atmosphere containing small amounts of ozone.

If desired, small amounts of a drier, as for example, manganese resinate, cobalt linoleate, etc., may be added to the ozonized polymerized product and its drying rate further increased.

If desired, the ozonized pine derivative may be subjected to a mild heat treatment before use in order to stabilize it, and without substantially effecting its drying rate. For example, it may be heated up to 120° C., or preferably about 100° C., with or without the presence of steam or water. Further, if desired, before use the ozonized pine derivative may be washed either with water or with a dilute alkali solution for the purpose of removing acidic substances from it.

It will be understood that the ozonized polymerized product according to my invention may be produced without the use of any particular form of apparatus; and it will be understood that in effecting the polymerization of the pine derivative prior to ozonization the polymerization of the pine derivative may be effected in the vapor phase as well as in the liquid phase without departing from my invention. Further, the ozonized pine derivative is miscible with linseed oil and china wood oil, hence it may be blended with either before use as, for example, in paints or varnishes.

Having now fully described my invention, what I claim and desire to protect by Letters Patent is:—

1. The method of producing a drying oil, which includes polymerizing a pine derivative and subjecting the polymerized product to ozonization.

2. The method of producing a drying oil, which includes polymerizing a pine derivative, subjecting the polymerized product to ozonization, and heating the ozonized product.

3. The method of producing a drying oil, which includes polymerizing a pine derivative, subjecting the polymerized product to ozonization and washing the ozonized product for the removal of acidic substances.

4. The method of producing a drying oil, which includes polymerizing a pine derivative and subjecting the polymerized product to the action of a fluid containing ozone.

5. The method of producing a drying oil, which includes polymerizing a pine derivative and subjecting the polymerized product to the action of a gas containing ozone.

6. The method of producing a drying oil, which includes polymerizing a pine derivative and subjecting the polymerized product to the action of oxygen containing ozone.

7. The method of producing a drying oil, which includes subjecting a pine derivative to treatment with heat and a polymerization catalyst and subjecting the polymerized product of such treatment to ozonization.

8. The method of producing a drying oil, which includes subjecting pine oil to treatment with heat in the presence of a catalyst to effect dehydration and partial polymerization and then subjecting the polymers produced to ozonization.

9. The method of producing a drying oil, which includes subjecting pine oil to treatment with heat in the presence of a catalyst to effect partial dehydration with the production of dipentene, effecting polymerization of the dipentene formed and subjecting the polymers produced to ozonization.

10. The method of producing a drying oil, which includes polymerizing dipentene and subjecting the polymers produced to ozonization.

In testimony of which invention, I have hereunto set my hand, at Kenvil, N. J., on this 12th day of October, 1927.

LANNING PARKE RANKIN.